T. E. MURRAY, Jr.
METHOD OF AND APPARATUS FOR ELECTRICALLY DIVIDING METAL PLATES.
APPLICATION FILED OCT. 10, 1917.
1,252,148. Patented Jan. 1, 1918.
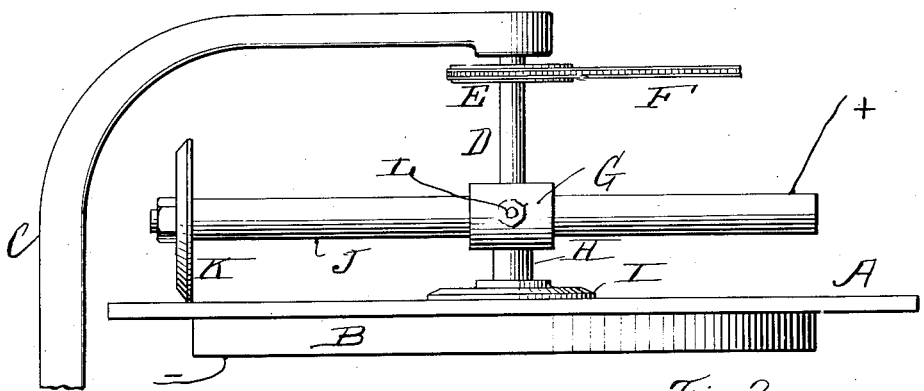
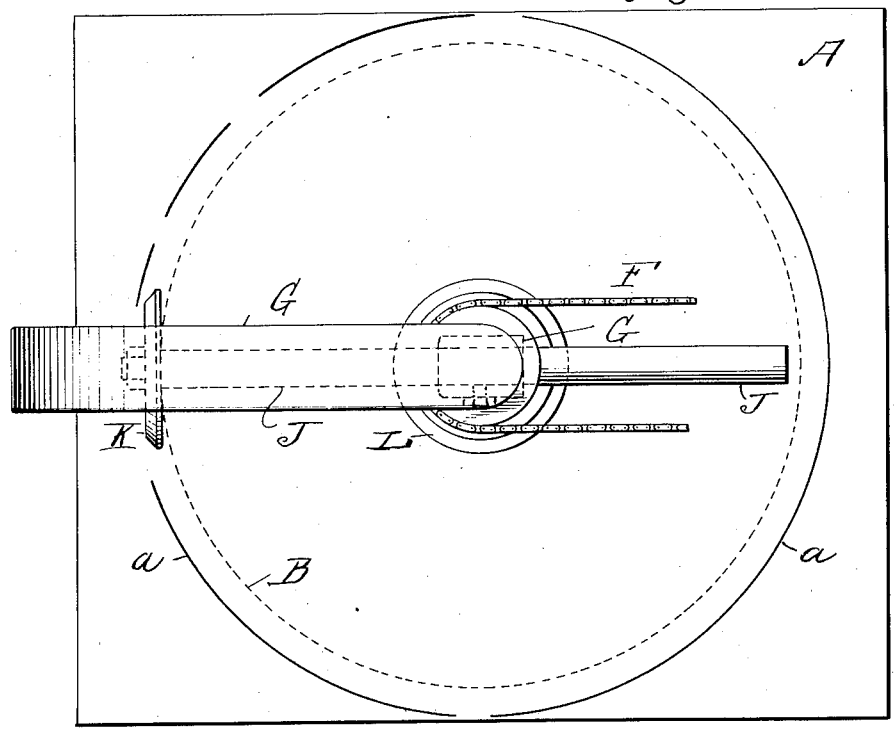

UNITED STATES PATENT OFFICE.

THOMAS E. MURRAY, JR., OF BROOKLYN, NEW YORK.

METHOD OF AND APPARATUS FOR ELECTRICALLY DIVIDING METAL PLATES.

1,252,148. Specification of Letters Patent. Patented Jan. 1, 1918.

Application filed October 10, 1917. Serial No. 195,739.

*To all whom it may concern:*

Be it known that I, THOMAS E. MURRAY, Jr., a citizen of the United States, residing at Brooklyn, in the county of Kings and State of New York, have invented a certain new and useful Improvement in Methods of and Apparatus for Electrically Dividing Metal Plates, of which the following is a specification.

The invention is a method and an apparatus for electrically dividing a metal plate. In the apparatus here illustrated, the plate is placed upon a metal electrode, so that it overlaps an edge of said electrode. A disk mounted on a horizontal shaft and having a beveled circumference or rim constitutes the other electrode. Said disk is caused to travel, by any suitable means, upon the surface of the plate to be cut, said path being substantially parallel to the edge of said electrode. The electric current causes the metal of the plate between the edge of the supporting electrode and the rim of the disk to become highly heated and fluid, whereby a kerf is formed separating the parts of the plate.

In the accompanying drawings I illustrate my invention applied to an apparatus in which the dividing disk travels in a circular path upon the plate, so that from said plate a circular section may thus be cut. Figure 1 is an elevation of said apparatus, and Fig. 2 is a plan view.

Similar letters of reference indicate like parts.

A is a metal plate, from which a circular section is to be removed. Said plate is supported upon a circular electrode B, preferably of copper or other material of high heat conductibility. C is a standard having a horizontal arm in which is journaled the vertical shaft D, which carries a pulley E, over which passes a belt F for rotating said shaft. To the lower end of shaft D is secured a horizontal sleeve G, and to the under side of said sleeve is attached a short shaft H which enters a step I which rests on the plate A. Adjustably secured by clamping screw L in sleeve G is a shaft J, to one end of which is clamped a metal disk K having a beveled rim. Said rim makes contact with the upper surface of plate B. The shaft J is to be so adjusted in sleeve G as that when said shaft is rotated, said disk K shall travel in a circular path substantially parallel to the circumferential edge of electrode B. One circuit terminal is here shown connected to the shaft J, and the other to electrode B.

The shaft J being adjusted in sleeve G to cause the disk K to travel over a circle on the surface of plate B, as described, the heating current is established, and the shaft D is rotated. The metal of plate A between the outer circumference of electrode B and the rim of disk K is highly heated and flows away, producing a circular kerf, and so dividing the circular section from the remainder of the plate B.

I have here illustrated the plate B in the form of a rectangle, but it will be obvious that I may use a plate of circular form, as indicated by the broken line *a*, *a* in Fig. 2. In this case, the apparatus will, of course, produce a circular section and a ring, either or both of which forms may be utilized as desired.

While I have here illustrated my invention in an apparatus wherein the dividing disk travels in a circular path, I do not limit myself to this construction, since it is apparent that I may move the disk K in a straight or sinuous path over the plate to be divided, the edge of the lower electrode bearing the same parallel relation to the dividing line selected, as the edge of circular electrode B bears to the circular line cut by disk K.

I claim:

1. Apparatus for electrically dividing a metal plate, comprising a supporting electrode for said plate, a disk electrode having a narrow circumferential edge bearing upon the upper surface of said plate, and means for causing said disk to travel over said surface in a line parallel to the edge of said support.

2. Apparatus for electrically dividing a metal plate, as in claim 1, the said supporting electrode being circular in shape, and the said means for causing said disk to travel being constructed to move said disk in a circular path, parallel to the circumferential edge of said electrode.

3. The method of electrically dividing a metal plate, which consists in placing said plate upon a supporting electrode to overlap the same, and then moving over and in contact with the surface of the overlapping portion of said plate, a second electrode in a path parallel to the edge of said first-named electrode.

In testimony whereof I have affixed my signature in presence of two witnesses.

THOMAS E. MURRAY, JR.

Witnesses:
GERTRUDE T. PORTER,
MAY T. MCGARRY.